W. F. RICHARDS.
CONTROLLING MEANS FOR MOTOR VEHICLES.
APPLICATION FILED OCT. 16, 1905.
912,489.
Patented Feb. 16, 1909.
2 SHEETS—SHEET 2.
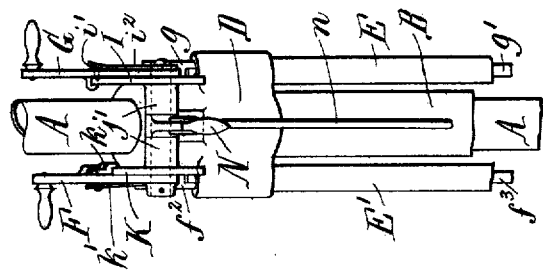
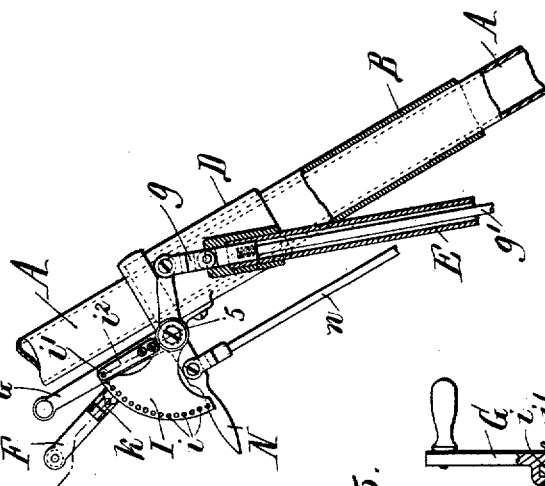
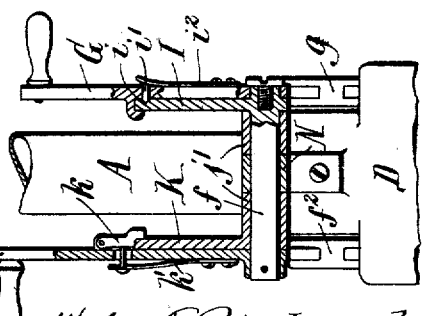
Witnesses:
E. A. Volk
R. W. Rumor.
Willard F. Richards, Inventor.
By Wilhelm, Parker & Hard,
Attorneys.

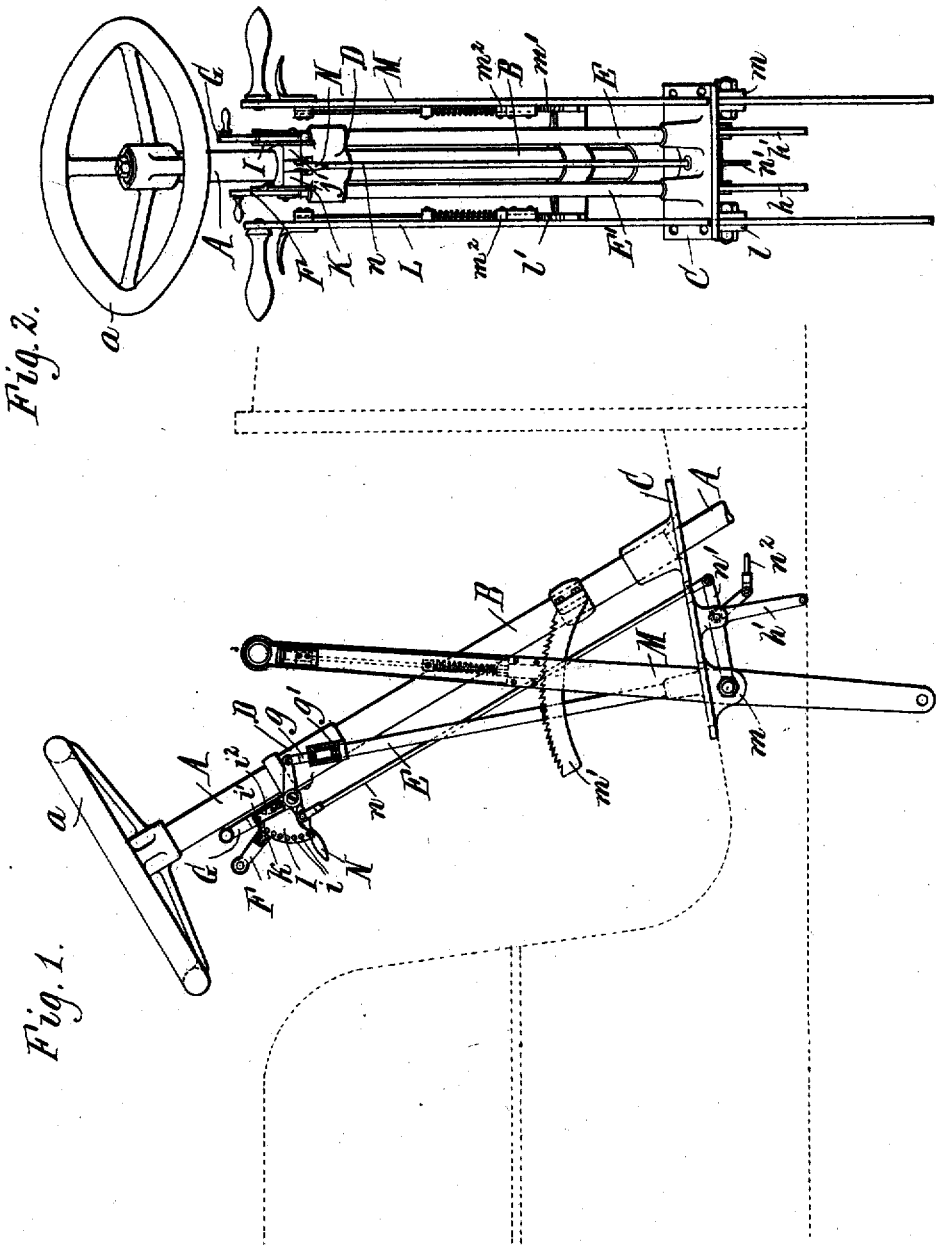

UNITED STATES PATENT OFFICE.

WILLARD F. RICHARDS, OF BUFFALO, NEW YORK.

CONTROLLING MEANS FOR MOTOR-VEHICLES.

No. 912,489.            Specification of Letters Patent.            Patented Feb. 16, 1909.

Application filed October 16, 1905. Serial No. 282,875.

*To all whom it may concern:*

Be it known that I, WILLARD F. RICHARDS, a citizen of the United States, residing at Buffalo, in the county of Erie and State of New York, have invented new and useful Improvements in Controlling Means for Motor-Vehicles, of which the following is a specification.

This invention relates to controlling means for motor vehicles and more particularly to controlling means for vehicles driven by explosive or internal combustion engines.

In most motor vehicles the steering post is located in front of the driver's seat but one or more of the controlling levers, for instance, the emergency brake lever or change-speed-gear lever, is located at the side of the machine where it is less convenient to reach and operate and where it often obstructs the passage to the driver's seat so as to make it necessary to get into and out of the vehicle at the opposite side.

One of the primary objects of this invention is to produce a compact and desirable arrangement of the steering post and other controlling levers or handles for the brake and other devices in front of the driver's seat where they are all within easy reach of the driver's hands.

Another object is provide a supporting stand for said several controlling levers or handles, so constructed that it will be light and occupy but little room in the vehicle but will be very strong and rigid, and will hold the levers or handles in their correct relation notwithstanding rough usage.

In explosive engines it is usually necessary to advance and retard the time of ignition according to the speed of the engine to insure the firing of the charge at the proper point of the cycle of operations of the engine and prevent backfiring. In engines having an electric igniter or sparker this is accomplished by adjusting the commutator to produce the igniting spark earlier or later accordingly as the speed of the engine is increased or decreased.

Another object of this invention is to so connect the igniter controlling lever or handle with the engine throttle lever or handle that the former, while being capable of independent adjustment as required, is moved with the throttle lever so that the ignition is properly timed by the act of regulating the throttle, thereby relieving the driver from the necessity of separately adjusting the igniter lever for different positions of the throttle.

In the accompanying drawings, consisting of two sheets: Figure 1 is a side elevation of a controlling means for motor vehicles embodying the invention, the outline of the vehicle being partially shown by broken lines to indicate the location of the controlling means therein. Fig. 2 is a rear elevation thereof. Fig. 3 is a fragmentary side elevation thereof, partly in section on an enlarged scale. Fig. 4 is a rear elevation, on an enlarged scale, of the parts shown in Fig. 3. Fig. 5 is a transverse sectional elevation thereof, on an enlarged scale, in line 5—5, Fig. 3.

Like letters of reference refer to like parts in the several figures.

A represents the steering post arranged, as usual, in a rearwardly-inclined upright position in front of the driver's seat and provided with the usual hand wheel $a$ at its upper end. The steering post is pivotally supported in a hollow column or tube B which is rigidly attached at its lower end to and rises from a base plate or casting C which is bolted or otherwise fixed to the floor of the vehicle in the position shown in Fig. 1. The column B is provided at its upper end with a head D and connecting this head with the base C at opposite sides of the steering column are two hollow braces or tubes E E'. The steering column and braces are secured to the base and head D in any suitable manner producing a strong rigid connection, and these parts form a light but very strong and stable stand upon which the various controlling levers or handles are mounted. A person in entering the vehicle is very prone to grasp the steering wheel to assist in lifting himself into the vehicle. With the lever stand constructed as described this can be done with impunity, for the stand holds the steering post from deflection under lateral pressure.

F and G represent, respectively, the levers or handles for operating the engine throttle valve and regulating the igniter to properly time the ignition in accordance with the speed of the engine. These levers, which will be hereinafter referred to as the throttle lever and igniter lever respectively, are arranged under the steering wheel at opposite sides of the steering post where they can be readily reached with the hands. The throttle lever is preferably pinned or otherwise fixed to one end of a horizontal fulcrum shaft $f$ journaled in suitable bearings $j'$ provided therefor at the rear side of the head D of the stand, and has a forwardly-projecting arm which is connected by a link $f^2$ to the upper end of a rod $f^3$ passing through and slidable endwise in one of the brace tubes of the lever stand. The igniter lever is fulcrumed concentrically with the throttle lever, being preferably pivoted loosely on the opposite end of the fulcrum shaft $f$, and has a forwardly-extending arm which is connected, as by a link $g$, to the upper end of a rod $g'$ which passes through and is slidable endwise in the other brace tube of the lever stand. The lower ends of the rods $f^3$ and $g'$ pass through the stand base and any suitable connecting means can be employed for transmitting the movement of said rods to the throttle valve and igniter device. In the construction shown, the lower ends of the rods $f^3$ and $g'$ are connected respectively to bell crank levers $h$ $h'$ which are connected to the throttle valve and ignited by means not shown.

The throttle and igniter levers F and G are preferably connected in such manner that the latter will be moved with the former but will at the same time be capable of movement or adjustment independently of the throttle lever. In the means shown in the drawings for this purpose, a segment I located beside the igniter lever is fixed to the fulcrum shaft $f$ in any suitable way to rock with said shaft when the throttle lever is oscillated. This segment is provided with a series of depressions $i$, Fig. 3, in one face and a pin $i'$ attached to the igniter lever by a spring $i^2$ is pressed by said spring against said segment so as to snap into said depressions in the segment in the movements of the igniter lever. The pressure of the spring pin in one of said depressions is sufficient to cause the igniter lever to turn with the segment when the latter is moved by the throttle lever F, but the spring pin only releasably holds the igniter lever to the segment and the igniter lever can be moved independently of the segment and throttle lever and set in any desired adjustment within the range of the segment. The two levers could be otherwise connected so that the one would be moved with the other and yet be capable of independent movement or adjustment. Any suitable means may be used for releasably holding the throttle valve in the positions to which it is moved. The means shown consist of a smooth edged segment K fixed to the bearing for the fulcrum shaft $f$ beside the throttle lever and a friction shoe $k$ pivoted to said lever and pressed against the surface of the segment by a spring $k'$ attached to the lever and connected to said friction shoe.

L and M represent two levers arranged at opposite sides of the steering column and passing through holes in the stand base, being fulcrumed to suitable lugs $l$ and $m$ depending from the base. The lower end of one of these levers, preferably the right hand one, is connected by suitable means (not shown) to the emergency brake, while the lower end of the other lever is connected to the change-speed-gear. The brake and change-speed-gear levers are within easy reach of the right and left hands respectively of the driver and are in very favorable position for quick operation, which is very desirable. These levers swing beside segment arms $l'$ $m'$ respectively which are rigidly clamped about the steering column or secured to the lever stand in any other suitable manner. The levers L and M are equipped with ordinary spring-pressed bolts or dogs $m^2$ to engage with teeth or notches on the segment arms to hold the levers in the positions to which they are moved.

N represents an alarm lever which is preferably arranged centrally of the stand and is pivoted loosely on the fulcrum shaft $f$ for the throttle lever. The alarm lever is connected, as by an upright rod $n$ passing through a hole in the stand base, and a lever $n'$ and rod $n^2$ below the base, with the horn or other alarm employed on the vehicle.

With the stand and levers constructed and grouped as described, a compact and desirable arrangement of the principal controlling levers or handles of the vehicle is secured. The stand described would be desirable for a set of levers arranged as stated, even though some or all of the levers are intended for purposes different from those mentioned. The described connection of the throttle and igniter levers is not limited to use with the particular arrangement of levers or construction of stand herein described, but is applicable generally for accomplishing the result described.

I claim as my invention:

1. The combination of a stand comprising a base, a hollow column rising from said base, a hollow brace connecting the upper portion of said column with said base, a steering post rotatably supported in said hollow column and provided at its upper end with means for turning it, a rod passing through said hollow brace, and a lever mounted on said stand and connected to said rod for moving it endwise in said hollow brace, substantially as set forth.

2. The combination of a stand comprising a base, a hollow column rising from said base and provided with a head, hollow braces arranged at opposite sides of said hollow column at an angle thereto and connecting said base and head, a steering post supported in said hollow column, rods passing through said hollow braces, and levers fulcrumed on said stand and connected to said rods, substantially as set forth.

3. The combination of a stand comprising a base, a hollow column rising from said base, a hollow brace connecting the upper portion of said column with said base, a steering post supported in said hollow column, a lever mounted on said stand, an endwise movable rod connected to said lever or handle and passing through said hollow brace, a lever fulcrumed on said base, and a holding segment for said lever on said stand, substantially as set forth.

4. The combination of a stand, a rotatable steering post supported by said stand, a device at the upper end of said post for turning it, controlling levers fulcrumed on the upper portion of said stand at opposite sides of the steering post to swing in vertical planes, parts operated thereby, and hand levers fulcrumed to the lower part of said stand to swing in vertical planes and extending upwardly at opposite sides of said steering post, substantially as set forth.

5. The combination of a stand, a rotatable steering post supported by said stand, a device at the upper end of said post for turning it, levers for actuating different devices fulcrumed on the upper portion of said stand at opposite sides of the steering post to swing in vertical planes, and separate hand levers for actuating other devices fulcrumed on the lower part of said stand to swing in vertical planes and extending upwardly at opposite sides of said steering post, substantially as set forth.

6. The combination of a stand, a rotatable steering post supported by said stand, a device at the upper end of said steering post for turning it, a pair of levers for actuating different devices fulcrumed on the upper portion of said stand at opposite sides of the steering post to swing in vertical planes, separate levers for actuating other devices fulcrumed on the lower part of said stand to swing in vertical planes and extending upwardly at opposite sides of said steering post, and a lever arranged between said pair of levers at the upper portion of said stand, substantially as set forth.

7. The combination of a stand, a rotatable steering post supported by said stand, a device at the upper end of said steering post for turning it, levers for actuating different devices fulcrumed on the upper portion of said stand at opposite sides of the steering post, connections between said levers for moving said levers together when one is actuated, one of said levers being also adjustable relative to the other lever, and separate levers for actuating other devices fulcrumed on the lower part of said stand and extending upwardly at opposite sides of said steering post, substantially as set forth.

8. The combination of a steering post, a stand in which said steering post is supported comprising a base, and a hollow brace for said steering post arranged at an angle to the steering post and fixed to said base, a rod passing through said hollow brace, and a lever fulcrumed on said stand and connected to said rod for moving it endwise in said hollow brace, substantially as set forth.

Witness my hand, this 11th day of October, 1905.

WILLARD F. RICHARDS.

Witnesses:
E. C. HARD,
A. L. MCGEE.